{ | United States Patent [19] | [11] Patent Number: 4,783,357 |
| van Dijk et al. | [45] Date of Patent: Nov. 8, 1988 |

[54] SYNTHETIC RESIN PLATE COMPRISING A COEXTRUDED SYNTHETIC RESIN FOAM LAYER

[75] Inventors: Frits A. van Dijk, Putte, Netherlands; Henri M. A. Verhaert, Poederlee, Belgium

[73] Assignee: General Electric Company, Pittsfield, Mass.

[21] Appl. No.: 40,016

[22] Filed: Apr. 20, 1987

[30] Foreign Application Priority Data

May 13, 1986 [NL] Netherlands ..................... 8601196

[51] Int. Cl.$^4$ ..................... B32B 3/00; B29C 47/00
[52] U.S. Cl. ..................... 428/119; 156/244.1; 156/244.13; 264/45.9; 428/166; 428/178; 428/188

[58] Field of Search ............... 428/131, 134, 135, 136, 428/178, 188, 166; 264/45.9; 156/244.11, 244.13

[56] References Cited

U.S. PATENT DOCUMENTS 4,565,723 1/1986 Hirsch ..................... 428/188

FOREIGN PATENT DOCUMENTS 109388 5/1984 European Pat. Off. ........... 428/71

Primary Examiner—William J. Van Balen

[57] ABSTRACT

The invention relates to synthetic resin plates comprising a coextruded synthetic resin foam layers. The synthetic resin plate comprises a main layer having continuous hollow chambers. Due to the presence of the coextruded synthetic resin foam layer, a completely flat plate can be obtained.

6 Claims, No Drawings

SYNTHETIC RESIN PLATE COMPRISING A COEXTRUDED SYNTHETIC RESIN FOAM LAYER

The invention relates to a synthetic resin plate built up from at least two layers of a synthetic resin one of which (the main layer) comprises continuous hollow ducts.

Synthetic resin plates comprising a layer having continuous hollow ducts are nown per se. For this purpose, reference may be made to EP-A No. 0108743 and EP-A No. 0105534.

It is known from GB-A No. 2041292 that such plates have an appearance which is not so attractive for some applications. As a matter of fact, these plates show the tendency of local sagging, as a result of which an uneven surface is obtained.

A solution to this problem is suggested in GB-A No. 2041292: for this purpose, a plate of a thermally deformable cross-linked polyethylene foam is laid on the plate formed by extrusion and in a subsequent process step it is shaped so that the shape of the extrusion matrix is reproduced. It necessary, a bonding agent is applied between the plate and the foam layer so as to obtain a good bonding.

The above-described method is time-consuming since in fact at least one extra manufacturing step is required.

The invention provides a solution to the above-mentioned problem in which no extra process step is necessary.

The synthetic resin plate according to the invention is characterized in that the second layer is built up from a synthetic resin foam layer coextruded with the main layer.

Synthetic resin plates comprising a main layer with continuous hollow ducts and a top layer coextruded therewith are known per se. For example, EP-A No. 0110238 disclosed synthetic resin plates comprising two coextruded coating layers of a synthetic resin, one of the said synthetic resins comprising a UV-absorption agent.

However, synthetic resin plates comprising a main layer with continuous hollow ducts and a coextruded synthetic resin foam layer are new. It has unexpectedly been found that upon coextrusion of a foam layer a flat surface is obtained in one step.

The synthetic resin layer according to the invention is preferably constructed on layers of one and the same synthetic resin, for example, of synthetic resins based on aromatic polycarbonates or also based on polymethacrylates.

It is also possible to provide a synthetic resin foam layer on each side of the main layer by coextrusion.

For some applications it may be desirable to provide a further layer, for example, a synthetic resin or textile, on the synthetic resin foam layer. This may be done, for example, by coextrusion or by gluing.

This further layer may be, for example, transparent, opalescent or opaque. Patterns may be printed on this further layer.

The invention also relates to a method of manufacturing the above-mentioned coextruded synthetic resin plate. In the method according to the invention the main layer is bonded at least on one side to a coextruded synthetic resin foam layer in a coextruder.

In the method according to the invention, at least two materials are applied to the coextruder: a material for the main layer and a material for the synthetic resin foam layer. The material for the synthetic resin foam layer comprises, in addition to the synthetic resin, an expansion agent which ensures the desired foam formation in the coextruder. The synthetic resin of the synthetic resin foam layer is preferably the same as the synthetic resin of the main layer.

We claim:

1. A synthetic resin plate built up from at least two synthetic resin layers one of which (the main layer) comprises continuous hollow ducts, characterized in that the second layer is built up from a synthetic resin foam layer coextruded with the main layer.

2. A synthetic resin plate as claimed in claim 1, characterized in that the main layer and the coextruded synthetic resin foam layer are manufactured from one and the same synthetic resin.

3. A synthetic resin plate as claimed in claim 2, characterized in that the main layer and coextruded synthetic resin foam layer are manufactured from a synthetic resin based on an aromatic polycarbonate.

4. A synthetic resin plate as claimed in claim 1, characterized in that a further layer is provided on the coextruded synthetic resin foam layer.

5. A synthetic resin plate as claimed in claim 1, characterized in that the synthetic resin plate is provided on each side of the main layer with a coextruded synthetic resin foam layer.

6. A method of manufacturing a coextruded synthetic resin plate built up from at least two layers by coextrusion of at least two synthetic resins bonding together to form a plate built up from more layers, the plate comprising a main layer having continuous hollow ducts and at least one second layer, characterized in that the main layer is bonded at least on one side to a coextruded synthetic resin foam layer in a coextruder.

* * * * *